Sept. 27, 1966 A. E. KRIEGER ETAL 3,274,882
INSPECTION APPARATUS FOR TRANSPARENT GLASS SHEETS
Filed Sept. 15, 1960 2 Sheets-Sheet 1

INVENTORS
Arthur E. Krieger and
BY Kenyon S. Golding
Hobbe & Swope
ATTORNEYS

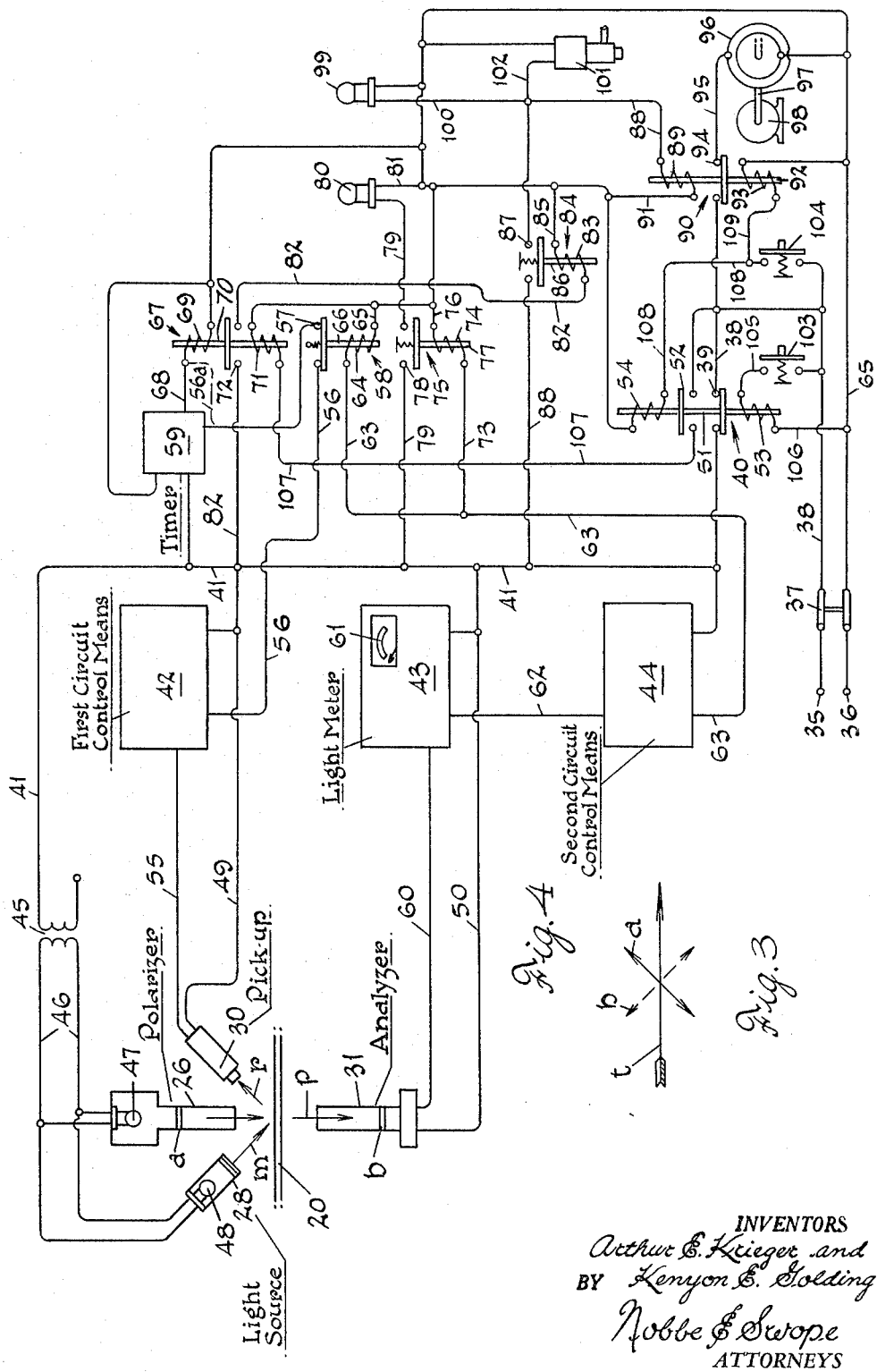

United States Patent Office 3,274,882
Patented Sept. 27, 1966

3,274,882
INSPECTION APPARATUS FOR TRANSPARENT GLASS SHEETS
Arthur E. Krieger, Toledo, and Kenyon E. Golding, Waterville, Ohio, assignors to Libbey-Owens-Ford Glass Company, Toledo, Ohio, a corporation of Ohio
Filed Sept. 15, 1960, Ser. No. 56,273
7 Claims. (Cl. 88—14)

The present invention relates broadly to the inspection of glass and more particularly to improved inspection apparatus for controlling movement of glass sheets or plates according to the physical properties thereof.

Although the invention is not restricted to any particular use, it is of especial utility in determining the presence of a desired condition of laminar stress or "temper" in sheets or plates of transparent glass. Laminar stress or temper may be defined as a physical property of glass which is produced by heating and then subjecting the glass to blasts of relatively cooler air, the resulting stress pattern of which can be observed by the use of polarized light.

In the manufacture of sheet or plate glass, it is customary, after the glass has been ground and polished or the surfaces thereof are otherwise finished, to cut the same to predetermined sizes or outlines and finish the edges thereof, after which the glass sheets, for some purposes, may be heated and then rapidly cooled to produce tempered glass. While all glass is conventionally annealed during its manufacture, and although tempered glass is considerably more resistant to breakage than ordinary annealed glass, this change in physical properties is not apparent to normal visual inspection. Consequently, when annealed glass sheets and tempered glass sheets of the same size or outline are passed through a suitable washing machine preparatory to final visual inspection and packaging, it is desirable to move the same on a conveyor through an area of polarized light to readily determine whether the glass sheets possessing different physical properties have been intermixed or not. Even with such a normal safe-guard, an inspector will occasionally overlook a glass sheet of one physical property or the other and not remove it, with the result that an annealed sheet, for example, may remain in a group of tempered glass sheets and either stored or finally packaged therewith.

A primary object of this invention, therefore, is to provide a simple yet efficient apparatus whereby a plurality of glass sheets or plates, while moving along a support conveyor, may be rapidly inspected in an accurate and convenient manner to determine if annealed and tempered glass sheets have been inadvertently intermixed and placed thereon.

According to the invention, this is accomplished by employing a polarized light system to determine the degree of laminar stress in each sheet of glass, and a co-operating monitor light system which functions in timed relation to cause activation of an electrical circuitry adapted to halt the conveyor. In the present instance and during the continuous movement of glass sheets possessing stress patterns within an acceptable range, the polarized light system will cancel out functioning of the above-mentioned electrical circuitry whereby the conveyor continues to operate; otherwise, after a suitable time interval, the said circuitry is completed to halt the conveyor thereby indicating the presence of an unacceptable glass sheet in the scanning area of the polarized light. Thus, if any annealed glass sheets are present in a group of tempered glass sheets, the presence thereof will be immediately called to the attention of an inspector.

Another object of the invention is to provide, in an inspection apparatus of the above character, an electrical system controlled by a monitor light unit which will spot a glass sheet having an undesired stress pattern moving along said conveyor and bring the conveyor to a halt to permit removal of the said sheet.

Another object of the invention is to provide an inspection apparatus wherein spaced sources of polarized light are employed with similar monitor systems through which a plurality of glass sheets are moved on a conveyor line to eliminate the possibility for a glass sheet of undesired stress pattern to continue therealong during failure of one source of polarized light transmission or the related monitor system to become activated.

Other objects and advantages of the invention will become more apparent during the course of the following description when read in connection with the accompanying drawings.

In the drawings wherein like numerals are employed to designate like parts throughout the same:

FIG. 3 is a diagrammatic view of the relation of the inspection apparatus to the line of movement of the glass sheets; and FIG. 4 is a diagrammatic view of the electric system of the apparatus.

Figures 1, 2:
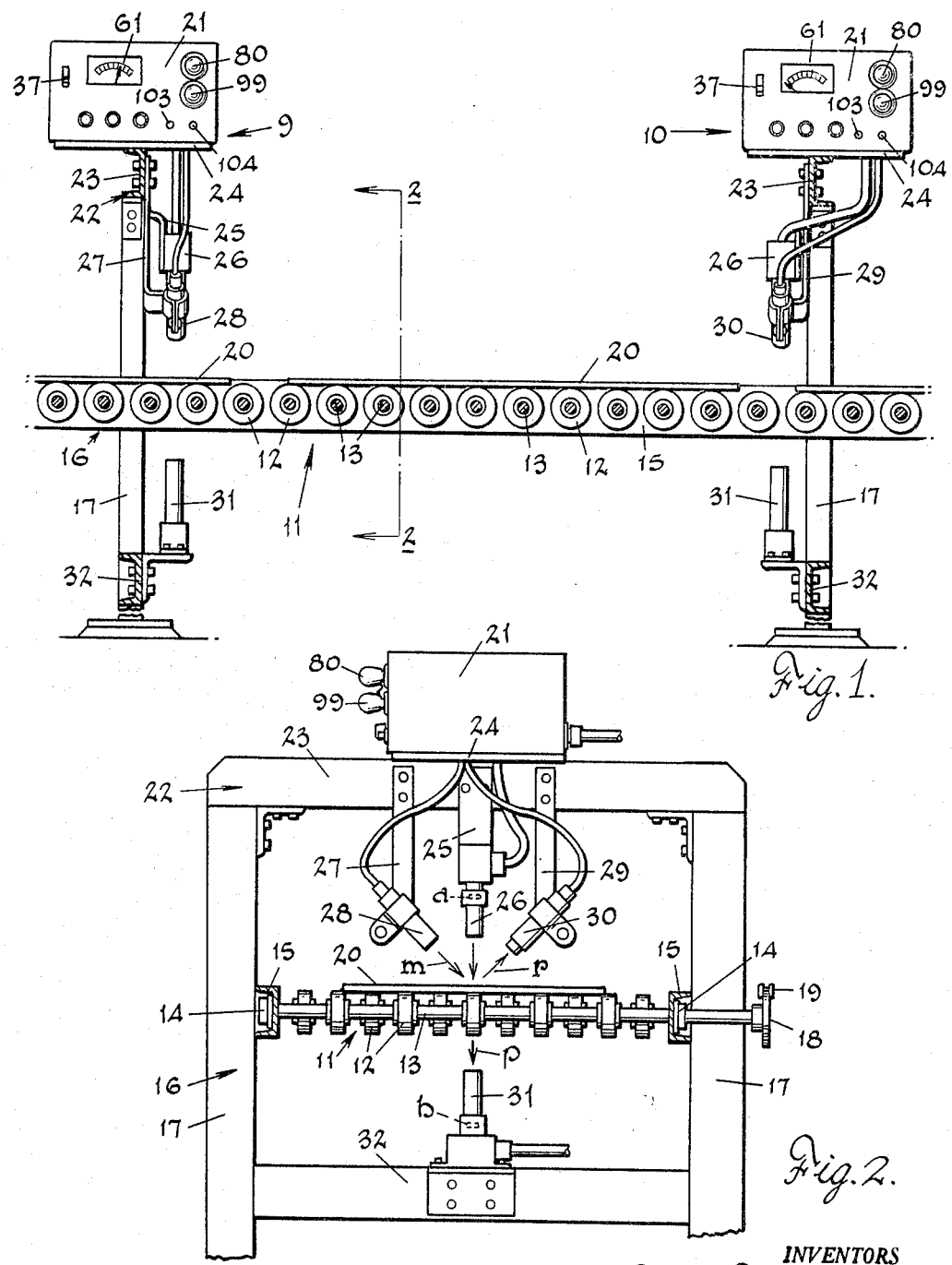
FIG. 1 is a side elevation of an inspection apparatus constructed in accordance with the invention.
FIG. 2 is a transverse vertical sectional view of the inspection apparatus as taken on line 2—2 of FIG. 1.

As previously mentioned, the inspection apparatus of the present invention is adapted to operate during the movement of glass sheets along a conveyor line and as each sheet passes through the immediate area thereof. It has been found to have particular utility in the inspection of the sheets when they are being passed to a point at which they are packaged for shipment, for in this area, all production operations thereupon have been completed and the sheets have been found to be otherwise satisfactory for their ultimate use. It has, however, been found that, through inadvertent handling during any of the production operations, untempered glass sheets may be placed in groups of sheets which have been tempered. This is particularly true when they are being edge finished, washed or scratch polished to remove small defects that are apparent to visual inspection. Accordingly, and while the apparatus can be employed to equal advantage for other related purposes, it will herein be described in connection with the final inspection of glass sheets before they are packaged.

Referring now to the drawings and particularly to FIG. 1, one inspection apparatus, generally designated by the numeral 9, and a second apparatus 10, are shown mounted in spaced relation along a conveyor 11 equipped with power driven rolls 12. As viewed in FIG. 2, the shaft 13 of each of the rolls 12 is supported at its ends in bearings 14 mounted on the horizontally disposed side channels 15 of the conveyor frame 16; said channels 15 being supported by spaced, vertically disposed legs 17. One end of each shaft 13 is provided with a sprocket 18 about which is trained a chain 19 that is conventionally driven by a power source, such as a motor and clutch shown and to be more fully described in connection with the system of FIG. 4.

The inspection apparatus 9 and 10, as viewed in FIG. 1, are arranged to function during movement of the glass sheets 20 along the conveyor 11 in either direction and at spaced areas of such movement to obviate the possibility that the sheets on the conveyor will be carried to the end thereof without having been inspected. Thus, in the event that the first apparatus for one reason or another fails to function the inspection operation will be carried out by the second apparatus; each apparatus 9 or 10 being of the same structure, the detailed description of one will suffice for both.

Essentially, each apparatus includes a control panel and instrument box 21, carried on a superstructure 22 of the conveyor frame 16 that has a horizontally disposed channel 23 with a mounting plate 24 on which the box 21 is secured. Suitably attached to the channel 23 is a depending bracket 25 for a light polarizing unit 26, a similar bracket 27 for a monitor light unit 28, and a bracket 29 for a light pick-up unit 30. As shown in FIG. 2, the polarizing light unit 26 is located substantially centrally above the conveyor rolls 12 and is carried by the bracket 25 with its longitudinal axis normal to the surface of the glass sheets 20 carried by said rolls. Cooperating with the light unit 26 is a polarized light ray receiver or analyzer 31 that is arranged beneath the conveyor rolls 12 and supported on a brace 32 of frame 16.

The polarizing disk or screen $a$ of the light unit 26 is located in relation to the analyzer screen $b$ of the receiver unit 31, such that a light beam passing through their angularly disposed axes will exhibit a low rate of light transmission, or otherwise stated, if the analyzer screen is to be visually observed, it will disclose a relatively dark field. This will be true when the light beam passes through air or a transparent object such as a regularly annealed sheet of glass. On the other hand, when a sheet of glass possessing laminar stress is introduced into the light beam, lightening of the analyzer field will admit an increased transmission of light which will cause the desired functioning of the receiver unit 31. In initially mounting the polarizing screen $a$ and analyzer screen $b$ in their respective units and maintaining the above-described relation of their axes, it is equally desirable to orient the axis of the polarizer screen so that it will be arranged at an angle of at least 45° to the longitudinal axis of the conveyor 11.

As shown in FIG. 3, this may be explained by the fact that when the axis of the polarizer screen $a$ is arranged at substantially 90° to the axis of the analyzer screen $b$, there will be an almost total absence of light transmission therethrough. And, when the axis $a$ is oriented to an angle, such as 45° to the longitudinal axis of the conveyor, for the purpose of the invention, the transmission of light will be at its optimum capacity. By interposing a specimen of tempered glass in the polarized light ray $p$ and rotating the same, it is possible to note that the light transmission can be varied between high and low values of transmitted light and with the axis $a$ arranged as above stated, the stress pattern of glass sheets moving along the line of movement $t$ will be evidenced by the highest light value. Such determination can be evaluated by further rotation of the specimen glass until the light transmission gradually is reduced toward its lowest value. Accordingly, such positioning of the polarizing system herein employed has been found to be preferable since the glass sheets are usually placed on the conveyor in relatively the same position with respect to their outlines and consequently the orientation of their individual stress patterns will be substantially the same while the sheets are passed through an inspection area.

The monitor light unit 28 is suported by its bracket 27 to direct a ray of light angularly toward the horizontal plane of the conveyor or the surface of a sheet thereon while the pick-up unit 30, which includes a photo-electric cell, is supported at a complementary angle to receive the reflection of the light ray from the upwardly directed surface of a glass sheet passing therebeneath.

During use of the inspection apparatus, the polarizing light unit 26 and monitor unit 28 are operated continuously to the end that the light rays $m$ and $p$ projected therefrom will be directed into the path traversed by the moving sheets and immediately intercepted by the surface of each sheet as it is moved into the vicinity of inspection. The units 26 and 28 are thus adapted to cause activation of the system of the apparatus and produce the functioning thereof as each glass sheet enters the area of inspection and its upper surface reflects the light ray $m$ from the unit 28.

Referring now to FIG. 4, there is shown a diagrammatic arrangement of the electrical devices employed in the system and the circuitry which, by the presence of a glass sheet, will be caused to function to either permit continuous operation of the conveyor 11 during movement of glass sheets having a similar stress or temper pattern or to halt such operation in the event that a sheet exhibits a different or unacceptable stress pattern. Such a circuit includes the lines 35 and 36 of a source of electrical power which are completed upon closure of a manual switch 37. Source line 35 is thus connected to supply line 38 which, through the normally closed contacts 39 of a relay switch 40, is extended by line 41 to one side of a circuit control or exciter unit 42, a comparator light transmission meter unit 43 and a circuit control or memory unit 44. Generally speaking, the exciter unit 42 includes an electrical relay adapted, when energized by the light pick-up unit 30, to complete the circuits of instrumentalities that will halt the conveyor. As well, the transmission unit 43 may be said broadly to include a relay system which becomes active according to the potential of electrical energy received from the analyzer unit 31. One side of this system institutes the operation of a timing device included in the memory unit 44 while the other side responds electrically to the said potential to complete a circuit such that will open the circuit of the exciter unit but only while the timing device is effective. The term "memory" is herein employed to include the function of any device adapted to repeatedly establish a time interval of adjustable predetermined length. Thus, activation of the exciter or first circuit control unit 42 will be produced by the monitor light unit 28 and pick-up unit 30 upon entry of a glass sheet into the inspection area while operations of the transmission unit 43 and memory or second circuit control unit 44, as influenced by the analyzer unit 31, will render the function of the exciter unit ineffectual during the continuous movement of glass having an acceptable amount of laminar stress through the inspection or scanning area.

Line 41 also is connected to a transformer 45 which by line 46 supplies the lamp bulb 47 of the polarizer unit 26 and the bulb 48 of the monitor light unit 28. Further extension of supply line 41 is made by branch lines 49 and 50 to the monitor pick-up unit 30 and the polarized light receiver 31 respectively. Supply line 41 thus basically furnishes electrical energy to the bulb 48 whereby the light ray $m$ is directed continuously downwardly and at an angle to the horizontal plane of the path traversed by the glass sheets. Relay switch 40 is of the double-action variety having an armature 51, carrying the normally closed contacts 39 and normally open contacts 52 and which is moved in response to activation of the opposed solenoids 53 and 54.

Now, when the light ray $m$ is intercepted by the upwardly directed surface of a glass sheet, it is reflected as the ray $r$ to the pick-up unit 30 which by lines 49 and 55 activates the exciter unit 42. This unit is connected by line 56 through the closed contacts 57 of a relay switch 58 to a timer relay 59; said timer being employed, if desired, to set up a time interval during which the area of the leading end of the glass sheet will intercept the light ray $m$. Simultaneously, with deflection of the ray $m$, the ray from lamp bulb 47, suitably polarized by screen $a$ in the unit 26, will direct light ray $p$ toward and through the glass sheet to the screen $b$ of the receiver unit 31. In turn, unit 31 functions through lines 50 and 60 to energize the light transmission unit or meter 43 to indicate the value of light transmission on a dial 61 and establish a circuit by line 62 to the memory unit 44. This unit of the inspection system is adjusted to, as above mentioned, establish a time interval in response to actuation of the unit 43. In the event that the electrical energy to said unit 43 is within the range setting thereof to denote a desired stress or temper pattern and, during functioning of the unit 44, a circuit is established therefrom by line 63 to the solenoid 64 of relay switch 58 and thence to the opposite source 36 by way of line 65. The spring-biased armature 66 of relay 58 disengages the contacts 57 thereof to open line 56 to the timing relay 59 to deactivate the same. As above mentioned, the timed interval of relay 59 is adjusted to afford a period of sufficient duration that an area at the leading end of the glass sheet will pass through the polarized light beam $p$ for the inspection operation and to then energize a relay switch 67 which is adapted to halt operation of the conveyor 11 when necessary. The timing relay 59 by line 68 may thus establish a circuit to the solenoid 69 of the relay switch 67. As in the case of the armature of relay switch 40, the armature 70 of the relay switch 67 is subject to action of the solenoid 69 and an opposed solenoid 71. Consequently, the normally open contacts 72 will become engaged during energizing of the solenoid 69 and then disengaged upon subsequent functioning of the solenoid 71.

On the other hand, should use of the relay 59 be deemed unnecessary, the line 56 could connect directly into line 68 as indicated by broken line 56a. In any event, operation of the memory or second circuit control unit 44, in response to the movement of a tempered glass sheet through the polarized light ray $p$, and completion of the line 63 will activate the solenoid 64 of relay switch 58 to open line 56 at contacts 57 with a resultant inactivity of the timer 59 or of the relay switch 67. During energization of the solenoid 64 of switch 58, branch 73 from line 63 completes a circuit to energize the solenoid 74 of relay switch 75, and thence by lines 76 to 65 to source 36, thus operating the spring-biased armature 77 and closing the normally open contacts 78 thereof. The engaged contacts 78 of switch 75 establish a circuit by lines 41 and 79 to a lamp bulb 80 and thence to source 36 by lines 81 and 65. The bulb 80 may be of any distinguishing color, such as green, to visually indicate to the operator or inspector that the present glass sheet has been satisfactorily processed and possesses an acceptable degree of temper as determined by its stress pattern.

Of course, when a glass sheet of tempered quality has been moved from the area of the light rays $m$ and $p$, the circuits of line 60 from the receiver unit 31 and line 62 from the transmission unit 43 will idle the second circuit control unit 44 to the end that the circuits activated by the circuit of lines 63 and 73 will be opened. This will enable the spring-biased armature 66 to re-establish the circuit of line 56 at the contacts 57 of the switch 58 thereby placing the same in condition for operation upon entry of a subsequent sheet of glass into the area monitored by the light ray from the unit 28. Likewise, the spring-biased armature 77 of relay switch 75 will be automatically moved to disengage the contacts 78 so that the circuit of line 79 will be opened to extinguish the bulb 80.

Where, however, an annealed glass sheet of the same size or outline has been inadvertently intermixed with the sheets of tempered glass and the units 43 and 44 do not function, the circuit from the receiver unit 30 will cause continued operation of the first circuit control or exciter unit 42 to maintain the circuitry of line 56 and operation of the timing relay 59 through line 68, or the direct connection by way of line 56a, will energize he solenoid 69 of relay switch 67 whereupon the armature 70 will cause engagement of contacts 72 to establish the circuit through lines 41 and 82 to the solenoid 83 of relay switch 84 and thence by lines 85 and 65 to opposite source 36. The spring-biased armature 86 closes contacts 87 to create a circuit through lines 41 and 88 to substantially simultaneously produce halting of the conveyor rolls 12, lighting of a warning bulb, as of a red color; and, if desired, application of a warning color or spot of water soluble dye to the glass sheet.

Thus, line 88 is completed to the solenoid 89 of relay switch 90 and by line 91 to opposite source 36. The armature 92 of switch 90 is operable to move in both directions by means of the solenoid 89 or the opposed solenoid 93 so that when solenoid 89 is energized by completion of the circuit through lines 88 and 91, the contacts 94 of said switch will be disengaged, thereby opening the circuit of line 95 from line 38 to one side of an electromagnetic clutch 96. Although other and equivalent devices may be employed to equal advantage, the clutch 96 is interposed in shafting 97 that is driven by motor 98 and is operable to drive the rolls 12 through the sprocket chain 19 (FIG. 2). Consequently, upon de-energization of the clutch, the sheet of glass then located in the inspection area will be halted substantially at the same time that a warning bulb 99 is lighted by a circuit through branch 100 from line 88. While a red bulb may be employed for this purpose, it is believed apparent that other warning devices such as an audible buzzer, bell or horn may be used to call attention to stoppage of the conveyor. As well, the operation of a spray gun, indicated at 101, can be actuated by a second branch 102 from line 88 to apply a spot of water-soluble dye on one surface of the glass sheet, as a precautionary measure, and serves the purpose of designating such a sheet until the same has been properly treated, as by tempering, or is otherwise disposed of.

The salient feature herein disclosed arises from the fact that after a glass sheet has been subjected to viewing by the polarized light ray $p$, the relay switch 58 will either be activated through the memory unit 44 to render the circuit to relay switch 67 inoperable, or the said switch 67 will become active to complete the necessary circuits to stop the conveyor positively thereby warning any adjacent personnel that the immediate glass sheet must be removed before resumption of conveyor operation should be accomplished. This situation is visually made known through use of the bulb 99 or audibly by any sounding device substituted therefor.

Following necessitated removal of a glass sheet, a pair of manual switches 103 and 104 are employed to, in one instance, open the circuits of the entire system to return the electrical devices thereof to their original conditions and in a second instance to restore the circuit of the electromagnetic clutch 96 whereby the shafting 97 will be adapted to again drive the conveyor rolls 12. The manual switch 103 is therefore employed to complete a circuit from supply line 38 and by line 105 through the solenoid 53 of relay switch 40 and by line 106 to the opposite source 36. This causes the armature 51 to separate contacts 39 and engage contacts 52 thereby opening the circuit to line 41 and simultaneously completing the circuit of a line 107 from supply line 38 to the opposed solenoid 71 of relay switch 67 to disengage the contacts 72 thereof and return the circuit of line 82 to its normally open condition. Discontinuance of the line 41, while manual switch 103 is held closed, opens the circuitry of the units 26, 28, 30 and 31 as well as of the units 42, 43 and 44.

Subsequent use of the second manual switch 104, on the other hand, reverses the condition of switch 40 to disengage the contacts 52 and re-engage the contacts 39 thereof to re-establish connection between the supply line 38 and line 41 and consequently restore the electrical circuitry to the various units of the apparatus. Switch 104, when temporarily closed, also completes a circuit to reverse the relay switch 90 whereupon the electro-magnetic clutch 96 will again drive the conveyor rolls through shafting 97. Thus, circuits from supply line 38 are completed by line 108 to the opposed solenoid 54 of the switch 40 to close contacts 39 and simultaneously by line 109 to the opposed solenoid 93 of the switch 90 thereby re-engaging contacts 94 to again complete the circuit of line 95 from supply line 38.

While, as above described, the property of the polarized light ray *p*, when directed through a transparent glass sheet having a good laminar stress pattern, will change the aspect of the analyzer screen *b* from a dark field to a lighter field to thereby influence the receiver or analyzer unit 31, it has been found that some sheets may possess an erroneous stress pattern or one that would be evidenced by a marginal band in compression and major inner areas in tension. This stress in the marginal band could therefore temporarily activate the transmission or meter unit 43 and memory or second circuit control unit 44 whereby the circuit of line 56 would be opened at relay switch 58 to cancel functioning of any further circuit, which would, otherwise, halt the conveyor. However, as the glass sheet is moved further into the scanning or inspection area, this circumstance will be dissipated as the polarized ray *p* passes through more centrally disposed areas of lesser or no stress and the unit 44 especially, ceases to function. This will enable restoration of the circuit of line 56 at the contacts of relay switch 58 which will result in activation of the relay switch 67 and eventual disengagement of the clutch 96, lighting of the bulb 99 and use of the warning spray as above described.

As aforementioned, the inspection apparatus 10 is of the same operative structure as the apparatus 9 and is essentially employed to function in the same manner. Thus, with a plurality of glass sheets moving to the right in FIG. 1, and during the continuous entry of glass sheets with good laminar stress into the area of the apparatus 9, the only indication of functioning within the system will be ascertained from the temporary reading of a pointer on the dial 61 and the on-off lighting of the bulb 80. This indication will also occur as the sheets move through the area of the monitor beam *m* of the apparatus 10 and, if desired, to distinguish the functioning thereof, the associated bulb 80 can be assigned a color differing from that of the bulb 80 of the apparatus 9. However, should the system of apparatus 9 sustain mechanical or electrical failure, inspection of glass sheets would then occur during their movement through the area of apparatus 10, with the sheets moving to the right along the conveyor 11 as in FIG. 1. This reduces, if not completely eliminates, any possibility for glass sheets of unsatisfactory stress properties to be released or passed from a control zone in which they could have been removed. In any event, when the sheets are received at the end of the conveyor, they will be known to possess substantially the same degree of laminar stress or temper and can be packaged or otherwise stored as a group of sheets of the same quality.

It is to be understood that the form of the invention herewith shown and described is to be taken as a preferred embodiment of the same, and that various changes in the shape, size and arrangement of parts may be resorted to without departing from the spirit of the invention.

We claim:

1. An inspection apparatus for transparent glass sheets, comprising a conveyor for supporting and moving a sheet forward along a substantially horizontal path, a light source for directing a beam of light at an angle on a sheet, a light pick-up unit for receiving the light beam from the light source which is reflected from the sheet, polarized light emitting means positioned at one side of the sheet between the light source and the pick-up unit and an analyzer for receiving polarized light rays from said polarized light emitting means positioned at the opposite side of the sheet in alignment with said polarized light emitting means, a timer for producing a signal after a predetermined time lapse, first circuit control means electrically connected with and interposed between the light pick-up unit and the timer and operable to activate said timer when energized by said light pick-up unit in response to the light reflected from the sheet, a motor for driving said conveyor, normally open switch means electrically connected with and interposed between the motor and the timer, said switch means closing in response to said signal from said timer to halt the operation of said motor, a second circuit control means, a light meter electrically connected with and interposed between said second circuit control means and said analyzer and operable to energize said second circuit control means when a predetermined amount of polarized light passes through said sheet and is received by the analyzer, a normally closed switch electrically connected with the second circuit control means and interposed between the first circuit control means and the timer, said normally closed switch being opened to break the circuit to said timer upon energizing of said second circuit control means by said light meter thereby de-activating the timer to allow continued operation of the motor, said second circuit control means being inoperable when insufficient polarized light passes through the sheet to said analyzer permitting continued operation of said timer.

2. An inspection apparatus as claimed in claim 1, in which electrical indicating means is electrically connected to the second circuit control means to indicate the operation thereof and further, in which electrical warning means is included in the electrical connection between the timer and the motor to indicate the stopping of said motor and conveyor.

3. An inspection apparatus as claimed in claim 1, in which a second normally closed switch means is interposed between and electrically connected to the normally open switch means and the motor, said timer being effective upon closure of the normally open switch means to open the second normally closed switch means to stop operation of the motor, and manual switch means for reopening the normally open switch means and re-closing the second normally closed switch means to restore operation of the motor.

4. An inspection apparatus as claimed in claim 1, including a double-action relay switch having opposed solenoids and normally closed contacts interposed between the motor and a source of electricity, in which the normally open switch means is a second double-action relay switch having opposed solenoids and normally open contacts, one side of the normally open contacts of the second relay switch being connected to one solenoid of the first relay switch, and in which the normally closed switch means is a single-action relay switch having a solenoid and spring-tensioned normally closed contacts, said normally closed contacts maintaining a circuit between the first circuit control means and the timer, the second circuit control means being electrically connected to the solenoid of the single-action relay switch to energize the same when said second circuit control means is operated by the light meter thereby opening the circuit between the first circuit control means and the timer to allow continued operation of the motor, and the timer completing a circuit to energize one solenoid of the second relay switch to close the contacts thereof thereby completing an energizing circuit to one solenoid of the first relay switch to open the contacts thereof to halt the motor when the light meter fails to operate the said second circuit control means.

5. An inspection apparatus as claimed in claim 4, including a second single-action relay switch having a solenoid and spring-biased normally open contacts, an indicating light electrically connected to one side of the normally open contacts of the second single-action relay switch, and the said solenoid of the second single-action relay switch being connected to the second circuit control means whereby when said second circuit control means is operated, the solenoid of the first single-action relay switch will disengage the contacts thereof to open the circuit from the first circuit control means to said timer and the solenoid of the second single-action relay switch will engage the contacts thereof to operate the indicating light.

6. An inspection apparatus as claimed in claim 4, including a second single-action relay switch having a solenoid and spring-biased normally open contacts, a warning light electrically connected to one side of the normally open contacts of the second single-action relay switch and the solenoid of the second single-action relay switch being connected to one side of the normally open contacts of the second double-action relay switch whereby when the timer completes a circuit to energize one solenoid of said second double-action relay switch to engage the contacts thereof, the solenoid of the second single-action relay switch will be simultaneously energized to close the contacts thereof and complete a circuit to the warning device as the motor is stopped.

7. An inspection apparatus as claimed in claim 4, including a first manual switch means electrically connected to the opposed solenoid of the second double-action relay switch to re-open the normally open contacts thereof whereby the electrical circuit to the first double-action relay switch will be disconnected and second manual switch means electrically connected to the opposed solenoid of the first double-action relay switch to restore operation of the motor.

References Cited by the Examiner

UNITED STATES PATENTS

| | | | |
|---|---|---|---|
| 2,803,755 | 8/1957 | Milford | 88—14 X |
| 2,993,402 | 7/1961 | Dunipace et al. | 88—14 |
| 3,028,783 | 4/1962 | Peters | 88—14 |
| 3,067,646 | 12/1962 | Reesen | 88—14 |

FOREIGN PATENTS 1,180,461  12/1958  France.

JEWELL H. PEDERSEN, *Primary Examiner.*

EMIL G. ANDERSON, *Examiner.*

T. L. HUDSON, *Assistant Examiner.*